United States Patent [19]
Billeter

[11] 3,714,968
[45] Feb. 6, 1973

[54] ANGLE COCKS WITH VENT VALVES

[75] Inventor: Henry R. Billeter, Deerfield, Ill.

[73] Assignee: Sloan Valve Company, Franklin Park, Ill.

[22] Filed: Sept. 29, 1971

[21] Appl. No.: 184,838

[52] U.S. Cl. ............137/596.2, 137/636.2, 137/315, 251/315
[51] Int. Cl.................................................F16k 11/00
[58] Field of Search...137/596.2, 636.2, 315, 623.21, 137/625.22; 251/174, 315

[56] References Cited
UNITED STATES PATENTS 1,471,115  10/1923  Farmer..........................137/596.2 X Primary Examiner—Henry T. Klinksiek
Assistant Examiner—Robert J. Miller
Attorney—Parker, Markey & Plyer

[57] ABSTRACT

A railroad car angle cock having a vent valve incorporated therein for manually bleeding the interior of the angle cock to atmosphere so that the air hoses between the railroad cars can be easily disconnected and without danger.

13 Claims, 4 Drawing Figures

PATENTED FEB 6 1973

3,714,968

INVENTOR.
HENRY R. BILLETER

BY
PARKER, MARKEY, & PLYER
ATTORNEYS 3,714,968

ANGLE COCKS WITH VENT VALVES

BACKGROUND OF THE INVENTION

As is well known, railroad cars have air brake hoses at each end which are connected together and each have an angle cock for controlling the air passage through the connection. When a brakeman separates the railroad cars he closes the two angle cocks between the connected cars to shut off the air flow, thereby trapping the air in the two air brake hoses. The brakeman then grasps and manually twists the hoses to forceably separate the connected ends. The trapped air being under pressure causes the hoses to snap apart and this often results in the ends of the hoses whipping around, endangering the brakeman, or damaging the hose couplings. Moreover, the hoses being under air pressure are most difficult to pry apart.

It is an object of the invention to design a new and improved angle cock in which there is incorporated a novel vent valve for venting the air hoses between railroad cars when the cars are to be separated.

A further object is to design an improved angle cock having a vent valve for releasing the air pressure in the air brake hoses between railroad cars so the hoses can be easily pryed apart without damage or injury to the brakeman.

It is another object to design an angle cock with a vent valve in which the vent valve is arranged in the bonnet of the valve body and is rotated by the operating handle along with the ball valve member.

BRIEF DESCRIPTION OF THE DRAWINGS

FIG. is a view of two railroad cars with the brake hose connections shown between them;

FIG. 3 is an enlarged partial view of the vent valve; while

DETAILED DESCRIPTION OF THE INVENTION

Figure 1:
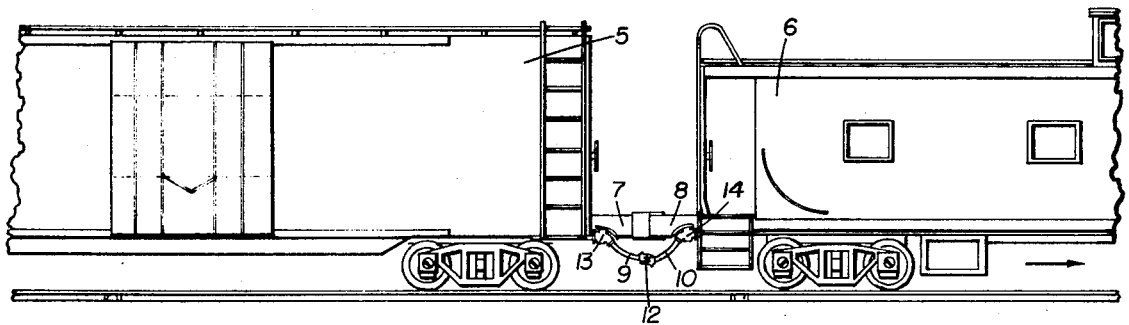

The invention is applied to the air brake connection between two railroad cars such as is depicted in FIG. 1, for example. The two cars 5 and 6 are connected together by the usual car couplers 7 and 8, while the air brake hoses 9 and 10 are connected by the air hose snap-on coupling members 12. Each air hose is also provided with the usual angle cock 13 and 14 for controlling the air passages through the hoses and the brake pipe extending throughout the length of railroad cars from the locomotive back to the caboose.

As has been pointed out, when the brakeman wishes to separate the railroad cars 5 and 6, he first turns the handles of the two angle cocks 13 and 14 to valve closed position, thereby trapping the air in the air brake hoses 9 and 10 between the two angle cocks. He then disconnects the car couplers 7 and 8 after which the two air hoses 9 and 10 are grasped and twisted at the coupling member 12 to disconnect the air hoses. Ordinarily when the hoses are pryed apart the air pressure in the section of hoses between the two closed angle cocks makes it rather difficult to disconnect the hoses, and many times causes damage to the hoses or injury to the brakeman. According to the present invention an arrangement is provided whereby these disadvantages are completely avoided as will be described.

Figure 2:
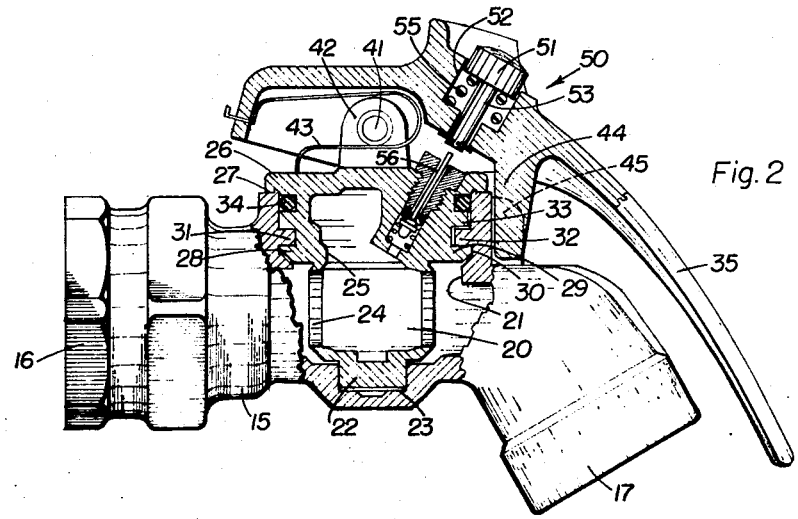
FIG. 2 is a partial cross-sectional view of an angle cock showing the preferred example of the invention.

Referring now to FIG. 2 this illustrates an angle cock having a body constructed generally along the lines of that disclosed in applicant's prior U.S. Pat. No. 3,591,137 issued July 6, 1971. The body 15 has a connection 16 for attachment to the brake pipe on the end of the railroad car, and a threaded connection 17 for attachment to one of the air hoses 9 or 10. The valve member 20 consists of a unitary structure inserted into the bore 21 of the body, the bottom end 22 being journaled in the body recess 23. The valve member 20 is of hollow shape and has a transverse passage 24 therethrough and is rotatable in the bore 21 for controlling the passage of air through the angle cock. The ball member 20 is supported and formed integral with a connecting portion 25 of the valve bonnet 26 and rotatable therewith. At the top end the bonnet 26 closes the opening of the bore 21 and has a portion 27 adapted to ride around the top of the body opening as the valve is rotated.

An O-ring seal 34 is arranged in a recess in the top end of the bonnet 26 and prevents leakage of air outward through the valve body and ball member as well as preventing moisture and foreign substances from entering the same, as pointed out in the aforesaid U.S. Pat. No. 3,591,137. The valve member 20 and bonnet 26 are removably held and locked in the body 15 by means of the locking lugs 28 and 29 formed in the bonnet portion 25 above the valve member 20 and on opposite sides thereof, the lugs riding in associated bore recesses. The lugs 28 and 29 are adapted to be rotated in an annular groove 30 formed in the bore 21 and are meshed or locked under oppositely disposed lugs 31 and 32 formed in the bore wall and engaging associated bonnet recesses as shown. An annular bearing and guiding ring 33 is formed around the bonnet portion 25 and at its top surface forms one wall of the O-ring 34 recess and at the bottom surface rides as a bearing on top of the lugs 31–32.

The valve member 20 and its bonnet 26 are inserted in the bore 21 from the top of the valve body 15 so that locking lugs 28 and 29 are registered with the spaces between the lugs 31 and 32. The valve member is then rotated 155 degrees clockwise until the locking lugs 28 and 29 are moved under the body lugs 31 and 32, thereby locking the valve member 20 and bonnet 26 in place on the valve body.

The operating handle 35 for opening and closing the angle cock is arranged for up and down movement as well as rotary movement. It is pivoted to the top of the bonnet 26 by pin 41 supported in a pair of upstanding lugs 42 formed on top of the bonnet. A curved leaf spring 43 normally biases the handle end in the downward position as shown. The valve handle 35 is locked by a lug 44 on the handle in the valve open position engaging a lug 45 and recess formed in the body under the handle. To close the valve the handle 35 is first lifted upward against the tension of spring 43 to clear the lug 44 from lug 45. It is then rotated 90 degrees counter-clockwise and released whereupon the handle lug 44 drops into another recess and stop lug on the body (not shown). The ball member 20 is now in valve closed position shutting off the air flow through the angle cock. The projecting stop 45 and the other one not shown, are located 90 degrees apart and limit the rotation of the handle to that extent of movement between open and closed positions of the valve.

When it is necessary to remove the valve member 20 and bonnet 26 from the valve body 15 for inspection or repair purposes, the handle pivot pin 41 is first driven out through the handle lugs 42 and removed, enabling the handle 35 to be taken off the top of the bonnet 26. By placing a tool between the lugs 42 it is then possible to rotate the valve member and bonnet further clockwise to a position beyond that occupied by the stop such as 45, since the handle and its lug 44 are no longer in place. In this position the locking lugs 28 and 29 are removed from under the confines of locking lugs 31 and 32 and are now in the spaces between them. The entire valve unit may now be withdrawn directly out of the bore 21 in the valve body. This arrangement insures that the valve member cannot be removed or the valve interior damaged by unauthorized persons. Further details of the foregoing operation and construction may be more clearly understood by reference to the aforesaid U.S. Pat. No. 3,591,137.

Figure 3:
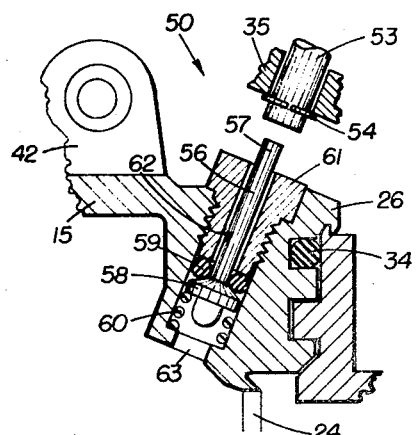
Figure 4:
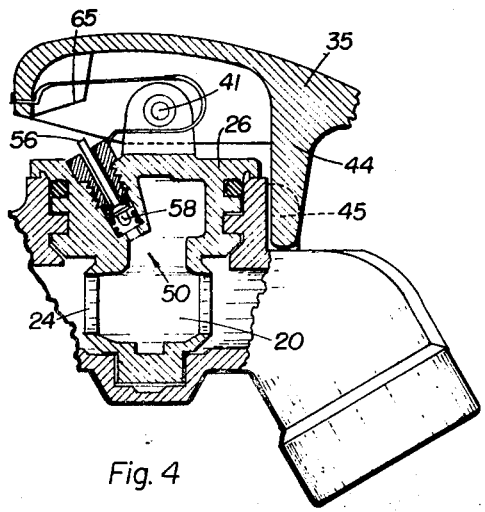
FIG. 4 shows a modified form of the invention.

The vent valve generally indicated at 50, for releasing the trapped air in the air hoses 9 and 10, includes a thumb operated push button 51 reciprocal in a recess 52 formed in the handle 35. The push button stem 53 passes through the handle and has a washer 54 fixed on the under side of the handle. A restoring spring 55 around stem 53 normally holds the button 51 in the retracted position as shown. The enlarged view FIG. 3 shows this more clearly. The vent valve has a valve stem 56 supported in the bonnet 26, the upper end 57 being spaced apart but in axial alignment with the lower end of push button stem 53. The valve stem 56 has a valve member 58 on the opposite end normally seated on O-ring 59 by urging of the spring 60. A supporting bushing 61, through which the vent valve stem 56 passes, is threaded into the top of the bonnet 26 and holds the parts assembled. The diameter of the valve stem 56 is smaller than the hole in the bushing 61, leaving a space 62 therebetween for passage of the air. An opening 63 in the bonnet in axial alignment with the valve stem 56 permits air to be exhausted from the interior of the ball valve member 20, to the exterior of the angle cock. It will be obvious that when the push button 51 is depressed, its stem 53 will contact the end 57 of valve stem 56 opening valve member 58 from its seat 59, and thereby exhausting the air from the angle cock interior.

An important feature of the invention is that the vent valve is supported in the bonnet 26 and therefore rotatable along with it when the handle 35 is operated. This makes it unnecessary to provide changes in the structure of the valve body 15 from the standard angle cock, and to provide for the vent valve it is merely required that the handle 35 and the bonnet 26 and ball valve 20 be substituted.

The vent valve 50 is operated whenever the railroad cars 5 and 6 are to be separated and the hoses 9 and 10 disconnected. As stated the angle cock is closed by rotation of the handle 35 and during this action if the brakeman attempts to depress the push button 51 he cannot operate the vent valve 50 because at that time he has lifted the handle in the up position between the lug 45, and the push button stem 53 is then considerably spaced beyond the end 57 of valve stem 56.

After the handles 35 on both railroads cars have been rotated the 90° clockwise to the valve closed position, the push button 51 on one of them is depressed by the brakeman when the handle is pulled down into the locked position. This opens the vent valve 58 from its seat 59 permitting the pressurized air in the two hoses 9 and 10 and in the angle cock, to escape to the atmosphere. This air escape path takes place through the vent valve opening 63, valve seat 59, the space 62 around stem 56, and outward. Releasing the push button 51 closes the vent valve again and the brakeman can now safely separate the air hoses 9 and 10. With this arrangement, the vent valve being located in the bonnet 26, is rotated along with it and is in the correct position below the push button 51 for actuation thereby.

It has been the practice when a railroad car has defective brakes, to connect it to the end of the train line in back of the caboose as shown in FIG. 1. Ordinarily this would automatically bleed the connecting hoses and render the defective car isolated from the brake pipe line. In the present invention the angle cock at the defective car is shut off without bleeding the air hoses except by depressing the push button. In such case should the cars become separated as in a wreck the brakes would automatically be applied to the train.

The position of the vent valve 50 under the handle 35 in each of its positions safely protects the vent valve from entry of water, snow or foreign substances.

THE MODIFICATION IN FIG. 4

In this angle cock the vent valve 50 is located on the opposite side of the bonnet 26 from that shown in FIG. 1. The construction of the vent valve is exactly the same, with the valve stem 56 projecting above the bonnet surface and closed on its seat 58. The vent valve is also rotatable along with the ball valve member 20 by the handle 35 when it is tilted upwardly from its locking position with lug 45. In the present case tilting the handle upward moves a lug or abutment 65 formed on the underside of handle 35, into engagement with the end of the vent valve stem 56, as the handle is being rotated. This permits escape of air from the air hoses during the rotation movement as well as at the beginning and at the end of the rotation. This allows a longer time for more complete exhaustion of the air from the hoses. In FIG. 1 the brakeman by only a momentary depression of the push button may not allow for complete venting.

What is claimed is:

1. In an angle cock, a body having an inlet and an outlet flow passage therethrough, a ball valve member in said body for controlling said flow passage, a bonnet on top of said body having a bonnet portion extending down into a bore formed in said body, said ball valve member being supported by and attached to the lower end of said bonnet portion, an operating handle attached to said bonnet for rotating said ball valve into open and closed positions in said flow passage, cooperating means on said body and operating handle for locking it in either the valve open and valve closed positions, said operating handle adapted to be tilted up from either of its locked positions to unlock the same and permit it to be rotated, a vent valve for bleeding air from said flow passage, and means on said operating handle for actuating said vent valve when tilted upwardly.

2. In an angle cock, a body having an inlet and an outlet flow passage therethrough, a ball valve in said body for controlling said flow passage, a bonnet on top of said body having a portion extending into a bore formed in said body, said ball valve being supported by said bonnet portion, an operating handle attached to said bonnet for rotating said bonnet and said ball valve to either open or close said flow passage, a vent valve supported in said bonnet for venting said flow passage, and means on said operating handle for manually actuating said vent valve.

3. In an angle cock, a body having an inlet and an outlet passage therethrough, a ball valve in said body for controlling said flow passage, a bonnet on top of said body having a portion extending into a bore formed in said body and attached to said ball valve, an operating handle attached to the top of said bonnet for rotating said bonnet and said ball valve to open or close said flow passage, said bonnet and said ball valve being hollow, a vent valve extending through said bonnet into its hollow portion for venting said flow passage, and a push button on said handle for actuating said vent valve in the closed position of said ball valve.

4. In an angle cock, a body having an inlet and an outlet flow passage therethrough, a ball valve in said body controlling said flow passage, a rotatable bonnet on top of said body having a portion extending into a bore formed in said body, said ball valve being attached to said bonnet portion and rotatable therewith, an operating handle attached to the top of said bonnet for rotating said bonnet and said ball valve to open and close said flow passage, said bonnet and said ball valve both being hollow, a vent valve extending outward through said bonnet from its hollow portion for venting said flow passage, an abutment on said operating handle, said operating handle adapted to be tilted upwardly to engage said abutment with said vent valve to operate said vent valve and thereby vent said flow passage, said abutment being effective to operate said vent valve in both the open and closed positions of said ball valve when rotated to those positions.

5. In an angle cock, a body having an inlet and an outlet passage therethrough, a ball valve in said body for controlling said flow passage, a bonnet on top of said body connected to said ball valve, an operating handle on said bonnet for rotating said bonnet and with it said ball valve to open and close said flow passage, cooperating locking means on said body and said handle for locking said handle in either of its positions, said handle being unlocked for rotation from said locking means by first being tilted upwardly, a vent valve in said bonnet controlling a vent passage from the interior of said ball valve and bonnet, and means on said operating handle for operating said vent valve to vent said flow passage whenever said operating handle is tilted to unlock the same for rotation.

6. The angle cock as claimed in claim 5 in which the vent valve is adapted to be operated by the operating handle in both the open and closed passage positions of the ball valve.

7. The angle cock as claimed in claim 5 in which the bonnet and ball valve are hollow and the vent valve controls the vent passage extending from the hollow interior of the bonnet and ball valve to atmosphere.

8. The angle cock as claimed in claim 5 wherein the vent valve is supported in the bonnet and consists of a valve stem extending through said bonnet having a valve member normally seated to close the vent passage between the flow passage and the atmosphere, and in which the operating handle has an abutment engageable with the vent valve stem to open the vent passage in either the open or closed positions of the ball valve.

9. In an angle cock for railroad cars for controlling the air passage between the cars, a body having a ball valve rotatable therein for opening or closing the air passage, a bonnet on said body attached to said ball valve, a handle on said bonnet for rotating the same and therefore said ball valve, said handle being locked for rotation in both the open and closed positions of said ball valve, said handle also being pivoted to said bonnet for upward movement to release it and enable the handle to rotate the ball valve, a vent valve for venting the air passage through said angle cock, said vent valve extending through said bonnet and being normally closed, and a manually operated push button on said handle adapted to be depressed when the handle is moved upwardly and rotated to open said vent valve and vent the air passage in either position of said ball valve.

10. In an angle cock as claimed in claim 9 in which the bonnet and ball valve are hollow and the vent valve is supported in and extends through the bonnet.

11. In an angle cock as claimed in claim 9 in which the push button for operating the vent valve is spring restored and supported in the angle cock handle, and in which the stem of the push button is arranged in axial alignment with the vent valve in all positions of the ball valve.

12. The angle cock as claimed in claim 11 in which the push button can only operate the vent valve when the handle is in either the open or closed position of the ball valve, and not during the time the ball valve is being rotated.

13. The angle cock as claimed in claim 11 in which the vent valve has a stem and a valve member on the stem seated on a valve seat arranged in the bonnet, and in which the end of the stem is adapted to be contacted and engaged by the push button in the handle to open the vent valve.

* * * * *